(No Model.)
W. H. SCHEER.
MOTOR.
No. 469,094. Patented Feb. 16, 1892.
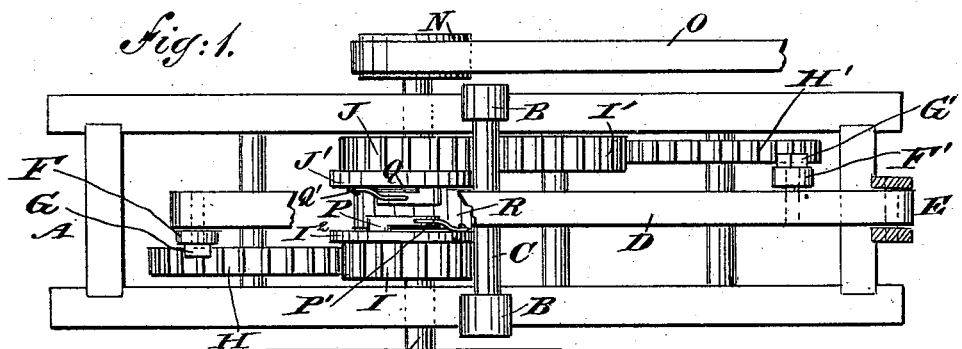
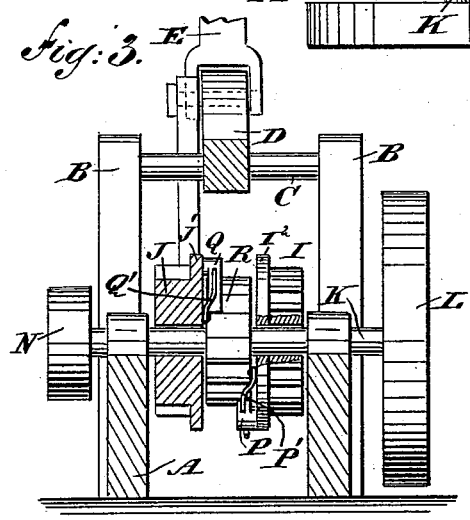
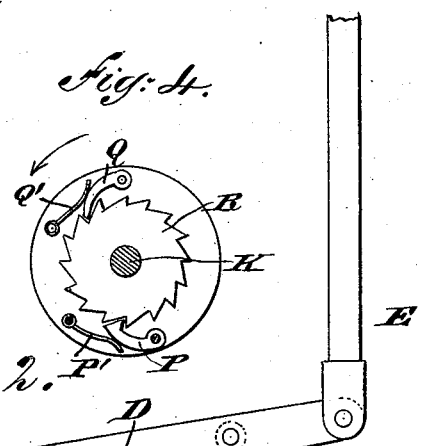
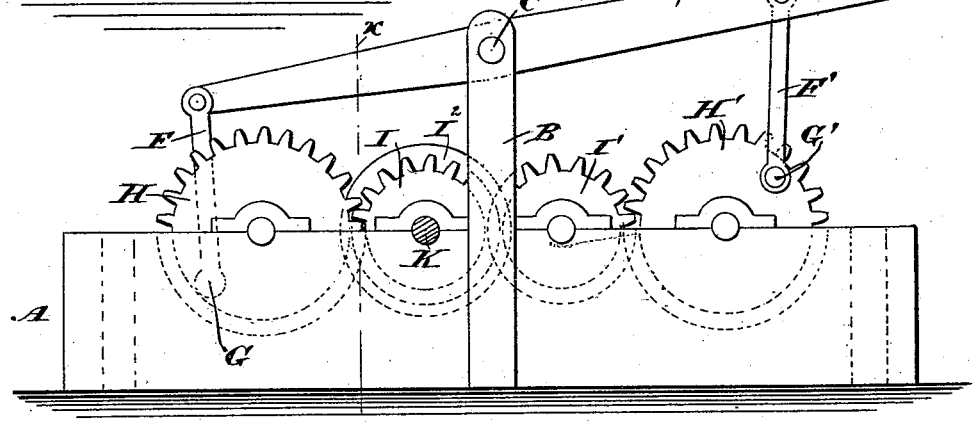
WITNESSES:
Chas. Nida.
C. Sedgwick.
INVENTOR
W. H. Scheer
BY Munn & Co
ATTORNEYS

UNITED STATES PATENT OFFICE.

WILLIAM H. SCHEER, OF FRANKFORT STATION, ILLINOIS.

MOTOR.

SPECIFICATION forming part of Letters Patent No. 469,094, dated February 16, 1892.

Application filed November 7, 1891. Serial No. 411,149. (No model.)

*To all whom it may concern:*

Be it known that I, WILLIAM H. SCHEER, of Frankfort Station, in the county of Will and State of Illinois, have invented a new and Improved Motor, of which the following is a full, clear, and exact description.

The object of the invention is to provide a new and improved motor which is simple and durable in construction and very effective in operation and which is more especially designed to be actuated from a windmill for conveniently driving a churn, grinding-wheel, and other similar small machines.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with parts broken out. Fig. 2 is a side elevation of the same with the fly-wheel omitted. Fig. 3 is a transverse section of the same on the line $x$ $x$ of Fig. 2, and Fig. 4 is a face view of the ratchet-wheel for transmitting motion.

The improved motor is provided with a suitably-constructed frame A, supporting the standards B, in the upper ends of which is journaled a shaft C, on which is fastened a lever D, pivotally connected at one end with a rod or link E, having a reciprocating motion and driven from the windmill or other suitable motor, so as to impart a swinging motion to the lever D. The lever D is connected at opposite sides of its shaft C by links F F' with studs G G', respectively, secured in the faces of gear-wheels H H', respectively, mounted to turn in suitable bearings on the main frame A. The gear-wheels H H' mesh in pinions I I', respectively, of which the pinion I' meshes in a pinion J, which, with the pinion I, is mounted to turn loosely on the main shaft K, extending transversely and mounted to turn in suitable bearings in the main frame A.

On one end of the shaft K is secured a suitable fly-wheel L and on the other end is attached a pulley N, connected by a belt O with the churn, grinding-wheel, or other machine to be driven. Other suitable mechanism may be employed to connect the shaft K with the machine to be actuated.

The pinion I is formed with an annular flange $I^2$, and a similar annular flange J' is formed on the pinion J, and on the flanges $I^2$ and J' are fulcrumed the pawls P and Q, respectively, extending in opposite directions and engaging a ratchet-wheel R, secured on the main driving-shaft K. Thus when the gear-wheel I is rotated in one direction its pawl P moves the ratchet-wheel R, and consequently the shaft K, in the same direction, and when a similar movement is given to the gear-wheel J its pawl Q rotates the ratchet-wheel R and the shaft K in the same direction. The pawls P and Q are held in mesh with the ratchet-wheel R by strings P' and Q', respectively, secured on the flanges $I^2$ and J' of the pinions I and J, respectively, as is plainly shown in the drawings.

The studs G and G' are arranged in opposite directions on their gear-wheels H and H', so that when the lever D receives a swinging motion from the windmill or other motor then rotary motion is imparted to the gear-wheels H and H' and by the latter to the intermediate pinion I', which rotates the gear-wheel J in the same direction as the pinion I is rotated from its gear-wheel H. Thus a continuous rotary motion is imparted to the main shaft K on both the up and down stroke of the lever D.

It will be seen that the device is very simple and durable in construction, takes up very little room, and is easily connected with a motor for driving the machine, and is also readily connected with the machines to be driven.

Having thus described my invention, I claim as new and desire to secure by Letters Patent—

1. A motor comprising a main driving-shaft, a ratchet-wheel secured thereon, pinions mounted to turn loosely on the said shaft and each carrying a pawl engaging the said ratchet-wheel, a gear-wheel in mesh with one of the said pinions, and a second gear-wheel in mesh with an intermediate pinion engaging the other pinion mounted loosely on the main shaft, and a lever mounted to swing and connected at opposite sides of its fulcrum by links with the said gear-wheels, substantially as shown and described.

2. In a motor, the combination, with a main driving-shaft and a ratchet-wheel secured thereon, of pawls engaging the said ratchet-wheel, pinions formed with annular flanges carrying the said pawls, the said pinions being mounted to turn loosely on the said main driving-shaft, a gear-wheel in mesh with one of the said pinions, an intermediate pinion in mesh with the other pinion, a second gear-wheel in mesh with the said intermediate pinion, links pivotally connected with the said gear-wheels, and a lever having a swinging motion and pivotally connected with the said links, substantially as shown and described.

WILLIAM H. SCHEER.

Witnesses:
JOHN LIESS,
EMIL KRAPP.